Figure 3:
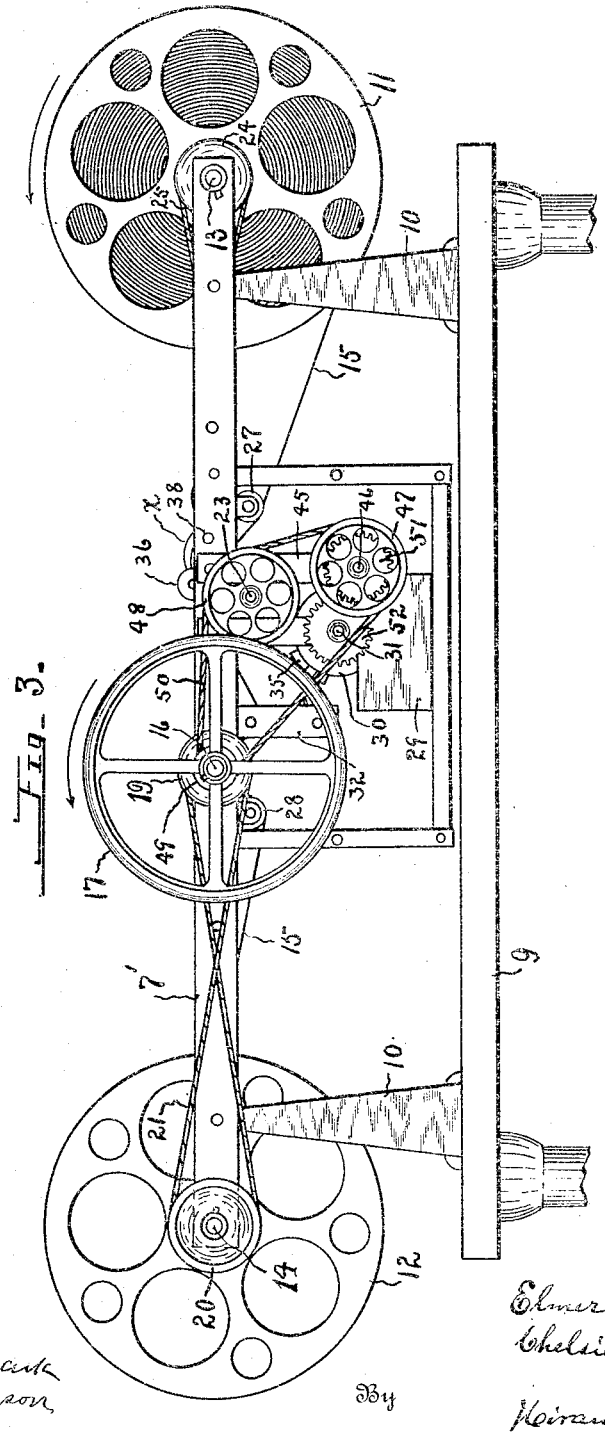

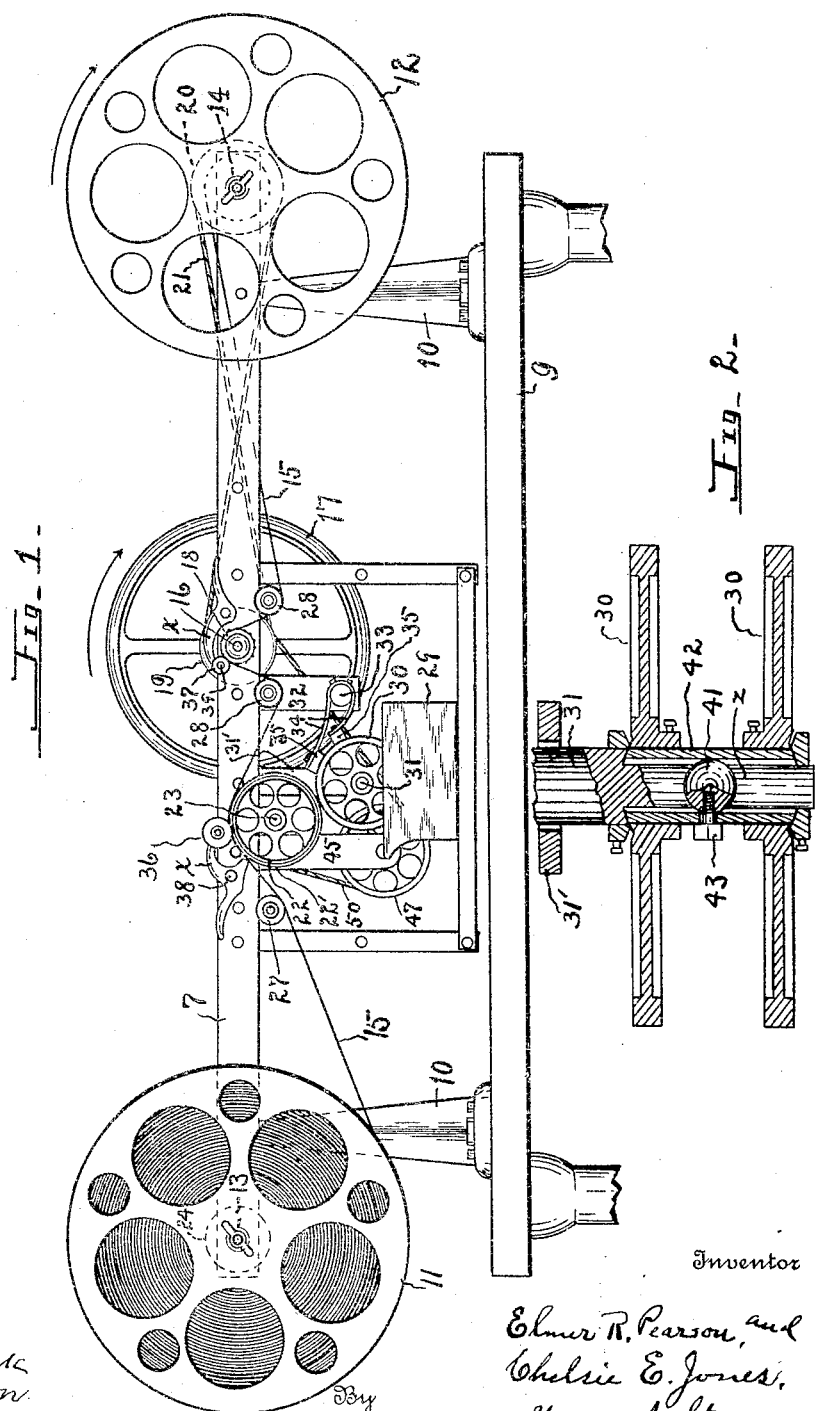

E. R. PEARSON & C. E. JONES.
FILM LUBRICATOR.
APPLICATION FILED AUG. 26, 1914.

1,225,270.

Patented May 8, 1917.
3 SHEETS—SHEET 2.

Witnesses
C. E. Clark
A. R. Leyson

Inventors
Elmer R. Pearson and
Chelsie E. Jones,
By Hiram A. Sturges,
Attorney

E. R. PEARSON & C. E. JONES.
FILM LUBRICATOR.
APPLICATION FILED AUG. 26, 1914.
1,225,270.
Patented May 8, 1917.
3 SHEETS—SHEET 3.
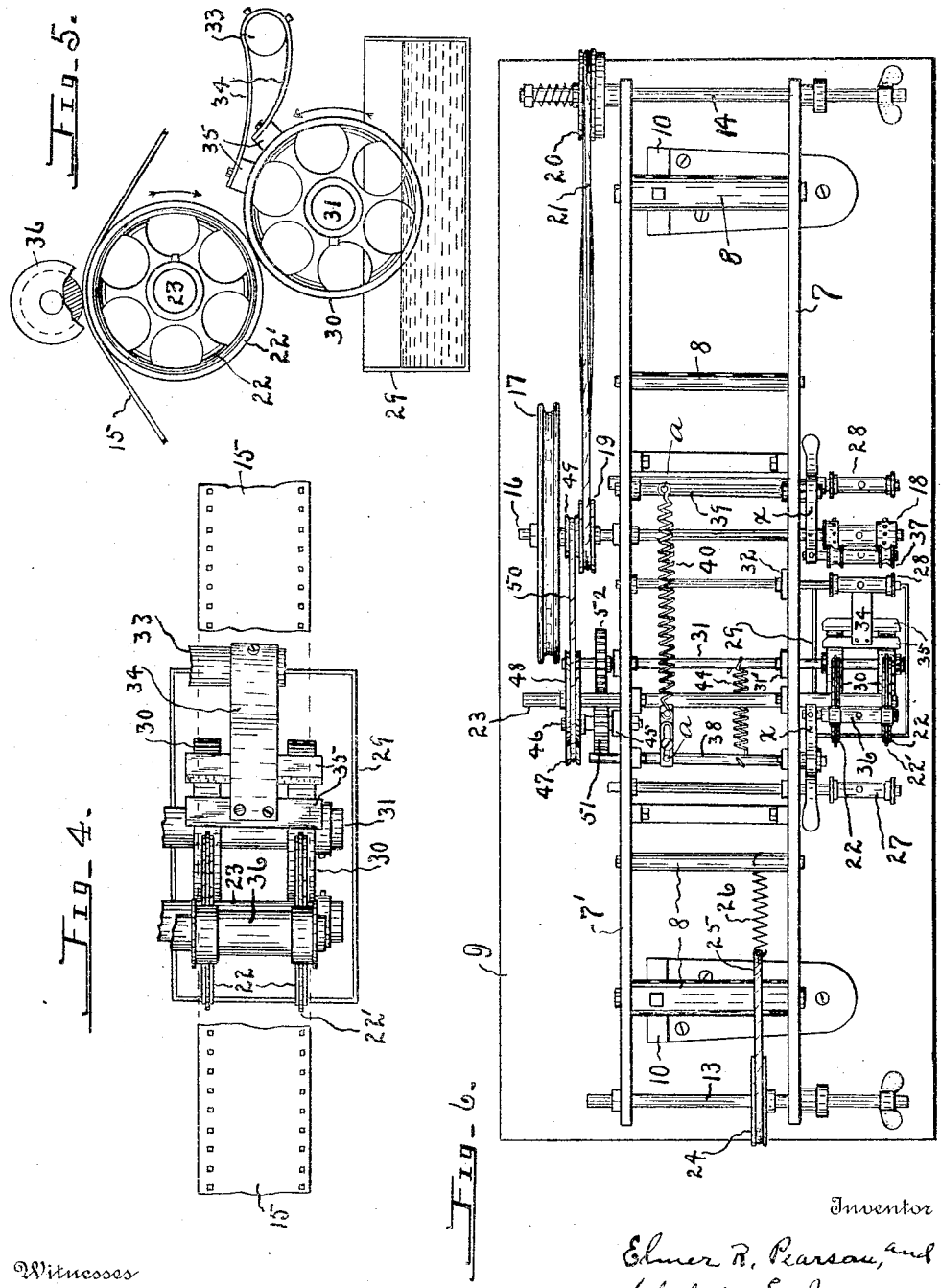
Witnesses
C. E. Clark
A. R. Leyson
Inventor
Elmer R. Pearson, and
Chelsie E. Jones.
By Hiram A. Sturges,
Attorney

UNITED STATES PATENT OFFICE.

ELMER R. PEARSON, OF OMAHA, NEBRASKA, AND CHELSIE E. JONES, OF COUNCIL BLUFFS, IOWA.

FILM-LUBRICATOR.

1,225,270.     Specification of Letters Patent.     Patented May 8, 1917.

Application filed August 26, 1914. Serial No. 858,616.

*To all whom it may concern:*

Be it known that we, ELMER R. PEARSON and CHELSIE E. JONES, citizens of the United States, residing, respectively, at Omaha, in the county of Douglas and State of Nebraska, and at Council Bluffs, in the county of Pottawattamie and State of Iowa, have invented certain new and useful Improvements in Film-Lubricators, of which the following is a specification.

This invention relates to means for applying a lubricant to moving-picture films. On account of the attenuation required for these films and the friction resulting from rapid movement when they are used, they become worn and their surfaces become injured. The principal object of the invention is to provide an apparatus of few and simple parts so constructed that a lubricant, limited in quantity, may be quickly and conveniently applied to the film at or near its edges. While the apparatus is particularly adapted for use in the lubrication of picture films, it may be employed to advantage for other purposes.

The invention consists of the novel construction, combination and arrangement of parts as described herein and claimed, and as illustrated in the drawing, wherein,—

Figure 1 is a view of the film lubricator in front elevation. Fig. 2 is a sectional detail to show the preferred mounting for the carrier wheels. Fig. 3 shows the film lubricator in rear elevation. Fig. 4 is a detail view on an enlarged scale showing the carrier wheels for elevating the lubricant, the detent or scraper-blades therefor, the contact-wheels, a compression-spool and a broken away part of a film. Fig. 5 is a view in side elevation, partly in section, of the parts shown in Fig. 4. Fig. 6 is a plan view of the film lubricator, the reels and film being removed.

Referring now to the drawing for a more particular description, any suitable frame may be employed, as the parallel strips 7 and 7' connected by spacing bars 8, and supported above the table 9 by the standards 10. Disposed at the front of the frame are the pair of reels 11 and 12, non-rotatively and removably mounted on the respective shafts 13 and 14, said shafts being journaled in and near the ends of the frame strips.

In order that the film 15 may be wound upon reel 12 from reel 11, certain means are employed. A driving shaft is indicated at 16. It is journaled in the frame strips between and is disposed parallel with shafts 13 and 14. It is provided at its rear end, outwardly of the frame, with a pulley 17 adapted to be rotated by any suitable means, its front end, outwardly of the frame, being provided with a sprocket wheel 18 disposed in alinement with the reels. The driving shaft is provided with a second pulley 19. Shaft 14 is provided, outwardly of the frame, with a pulley 20, and by means of the band 21, which connects these pulleys, shaft 14 may be rotated by the rotatable movement of the driving shaft for the operation of reel 12.

For lubricating the film during its movement toward reel 12, it is disposed upon and supported by a convexed contact-member consisting, preferably, of the pair of wheels 22 disposed adjacent to each other in alinement with the reels and sprocket wheel and mounted on the shaft 23; and, preferably, each of said contact-wheels is provided with a peripheral projection 22'.

In order that the film may be maintained in a taut condition any suitable braking means may be provided for shaft 13, as the pulley 24 mounted on said shaft, the band 25 carried by said pulley, and the spring 26 connected with the band and arranged to cause a pressure of the band upon said pulley, and tending to prevent a rotatable movement of this shaft. Also the spool 27 and the pair of spools 28, which are provided with suitable bearings and supported by the frame, operate to change the direction of movement of the film between the reels while supported by the sprocket wheel 18 and contact wheels 22, for maintaining it in a taut condition while moving from reel 11 to reel 12.

At 29 is indicated a receptacle for containing a lubricant, in which is disposed the circular carrier-member, preferably consisting of a pair of wheels 30 mounted upon the revoluble shaft 31, said shaft being loosely mounted at its front end in the hanger 31'. At 32 is indicated a hanger supported by the strip 7 and provided with the pin 33 upon which is mounted the pair of springs 34, each provided at its free end with a blade or contact-plate 35 engaging the peripheries of wheels 30 and tending to detain any excess of the lubricant and to prevent a deposit thereof upon the peripheries of wheels 22. Since the peripheries of wheels 30 engage the peripheral projections of wheels 22 the lubricant will be deposited thereon, but said deposit will be limited in quantity on account of the operation of the resiliently mounted plates 35. Wheels 22 are disposed at a distance from each other somewhat less than the width of the film so that the narrow peripheral projections 22' will engage said film adjacent to its edges, this being desirable so that these parts may be suitably lubricated and that a deposit of the lubricant, midway between the edges of the film, will be prevented.

When the wheels 30 are rotating the lubricant that adheres to their peripheries will first be moved against the lower blade 35 which operates to remove the greater portion of the lubricant, the upper blade 35 effecting a removal of nearly all of said lubricant. The use, therefore, of a plurality of blades is desirable, since it will be appreciated that a very limited supply of a lubricant should be applied to a film.

At 36 and 37 are respectively indicated roller members or spools, each being mounted upon the finger piece $x$ of the respective shafts 38 and 39, said shafts having suitable bearings in the frame. By reason of the operation of the spring 40 having its terminals mounted upon the outwardly projecting pins $a$ with which shafts 38 and 39 are provided (Fig. 6), the spools have a normal downward pressure. The function for spool 37 is to cause normal engagement of the teeth of the sprocket wheel 18 in the perforations of the film.

The function for spool 36 is to cause a normal pressure of the film against the peripheral projections 22' of wheels 22 so that the limited quantity of the lubricant thereon will be uniformly applied to the film. For the purpose of providing uniformity of contact of the peripheries of wheels 30 with the peripheral projections of wheels 22 additional devices are provided, as shown in Fig. 2, consisting of the ball or enlarged, convexed part 41 of shaft 31 and its bearings. In this construction a sleeve 42 is employed upon which wheels 30 are mounted, said sleeve having a diameter substantially equal to that of the convexed part or ball 41, and of greater diameter than that of the terminal portion $z$ of shaft 31. Since the sleeve is pivoted to the ball midway between wheels 30 by the keeper 43, said wheels will be permitted to have a relative swinging movement. By operation of spring 44 (Fig. 6) mounted at its terminals upon shafts 31 and 38, the wheels 30 will normally be pressed against members 22', and if the peripheries of the wheels become worn or if there is undue vibration while the lubricator is in operation, the sleeve 42 may swing sufficiently, under control of spring 44, to cause the uniform degree of contact of these wheels for the purpose described.

At the rear part of the frame is a hanger 45 in which is journaled the stub shaft 46, on which is mounted the idler pulley 47. A pulley 48 is mounted upon the shaft 23, and a third pulley 49 is mounted on the driving shaft; and by use of the band 50 the pulleys 47 and 48 may be revolved by the rotatable movement of said pulley 49. Shaft 46 is provided with the pinion 51 engaging pinion 52 of shaft 31 for rotating the carrier wheels 30.

By use of the device picture films may be quickly lubricated, with the result that they will be protected from injury, fractures or abrasions will be prevented and they will be more durable in wear. The lubricant should be applied to one side near the edges of the film, and the application must be exceedingly attenuated so that it will not reach the middle part of the film.

While the parts have been described in detail, it will be understood that many of these details may be changed or omitted, the drawings and description herewith presented relating to only one embodiment of the invention, the scope of the invention being determined by the appended claim.

We claim:

A film-lubricator of the type described, including rotary members over which may be passed a film and the like, rollers for aiding the retention of the film in its passage over the first referred to rotary members, lubricant-applying rotary members for engagement with the first referred to rotary members for applying the lubricant thereto, pairs of resiliently-held wiping members engaging said lubricant-applying rotary members, one wiping member of each pair being arranged in advance of the other member, each of said lubricant applying rotary members including a sleeved shaft, the sleeve being spaced from said shaft and the shaft having a spherical formation arranged in contact with the inner surface of said sleeve, said sleeve having pivotal connection with said shaft.

In testimony whereof, we have affixed our signatures in presence of two witnesses.

ELMER R. PEARSON.
CHELSIE E. JONES.

Witnesses:
HIRAM A. STURGES,
KENNETH S. FINLAYSON.